United States Patent [19]

Levin et al.

[11] Patent Number: 4,862,813

[45] Date of Patent: Sep. 5, 1989

[54] HIGH TEMPERATURE GAS CLEANING IN MUNICIPAL SOLID WASTE INCINERATION SYSTEMS

[75] Inventors: George B. Levin, Mount Lebanon; Suh Y. Lee, Monroeville; James H. Moritz, N. Huntingdon, all of Pa.

[73] Assignee: Westinghouse Electric Corp., Pittsburgh, Pa.

[21] Appl. No.: 233,925

[22] Filed: Aug. 15, 1988

Related U.S. Application Data

[63] Continuation of Ser. No. 30,001, Mar. 23, 1987, abandoned.

[51] Int. Cl.[4] .............................................. F23D 3/00
[52] U.S. Cl. ........................................ 110/216; 55/387; 110/203; 110/246; 422/177
[58] Field of Search ............... 110/203, 210, 216, 217, 110/233, 235, 237, 246, 344, 345, 346; 431/5, 7; 427/168, 171, 177, 178; 55/74, 387, 68, 73

[56] References Cited

U.S. PATENT DOCUMENTS

| | | | |
|---|---|---|---|
| 3,822,651 | 7/1974 | Harris et al. | 110/246 X |
| 4,018,568 | 4/1977 | Brewer | 110/210 X |
| 4,036,032 | 7/1977 | Brewer et al. | 110/203 |
| 4,066,024 | 1/1978 | O'Connor | 110/246 X |
| 4,226,584 | 10/1980 | Ishikawa | 110/246 X |
| 4,373,452 | 2/1983 | Van Dewoeshine | 110/203 |
| 4,437,418 | 3/1964 | Guillane et al. | 110/246 |
| 4,615,283 | 10/1986 | Ciliberti et al. | 110/216 |
| 4,678,643 | 7/1987 | Fetzer | 422/178 X |

OTHER PUBLICATIONS

Duval, D. S. and Rubey, W. A., "Laboratory Evaluation of High-Temperature Destruction of Polychlorinated Biphenyls and Related Compounds", US EPA Report EPA-600/2-77-228, Dec. 1977.

Shaub, W. M. and Tsang, W., "Dioxin Formation in Incinerators", Environmental Science Technology, vol. 17, No. 12, pp. 721-730, 1983.

Rubey, W. A., Dellinger, B., Hall, D. L. and Mazer, S. L., "High Temperature Gas-Phase Formation and Destruction of Polychlorinated Dibenzofurans", Chemosphere, vol. 14, No. 10, pp. 1483-1494, 1985.

Rordorf, B. F. and Marti, E., "Thermal Destruction of Polychlorinated Compounds: Flow Tube Kinetics of Ten Dibenzo-para-Dioxins", Thermochimica Acta, 85, pp. 439-442, 1985.

Drum, D. A., "A Control Methodology for Municipal Solid Waste Incineration", Paper 85-76A.3, presented at the APCA's 78th Annual Meeting, Detroit, Jun. 1985.

Primary Examiner—Henry C. Yuen

[57] ABSTRACT

A waste material incinerator which produces an exhaust, containing trace amounts of a toxic organic substance, includes a flue containing a refractory filter. The refractory filter is heated by the exhaust produced by the incinerator to a temperature above 700° C. to destroy the toxic organic substance in the exhaust. The refractory filter preferably includes a plurality of ceramic cylinders and is periodically cleaned to remove accumulated solid particles on the upstream surface of the cylinders by injecting high pressure air into the cylinders.

4 Claims, 5 Drawing Sheets

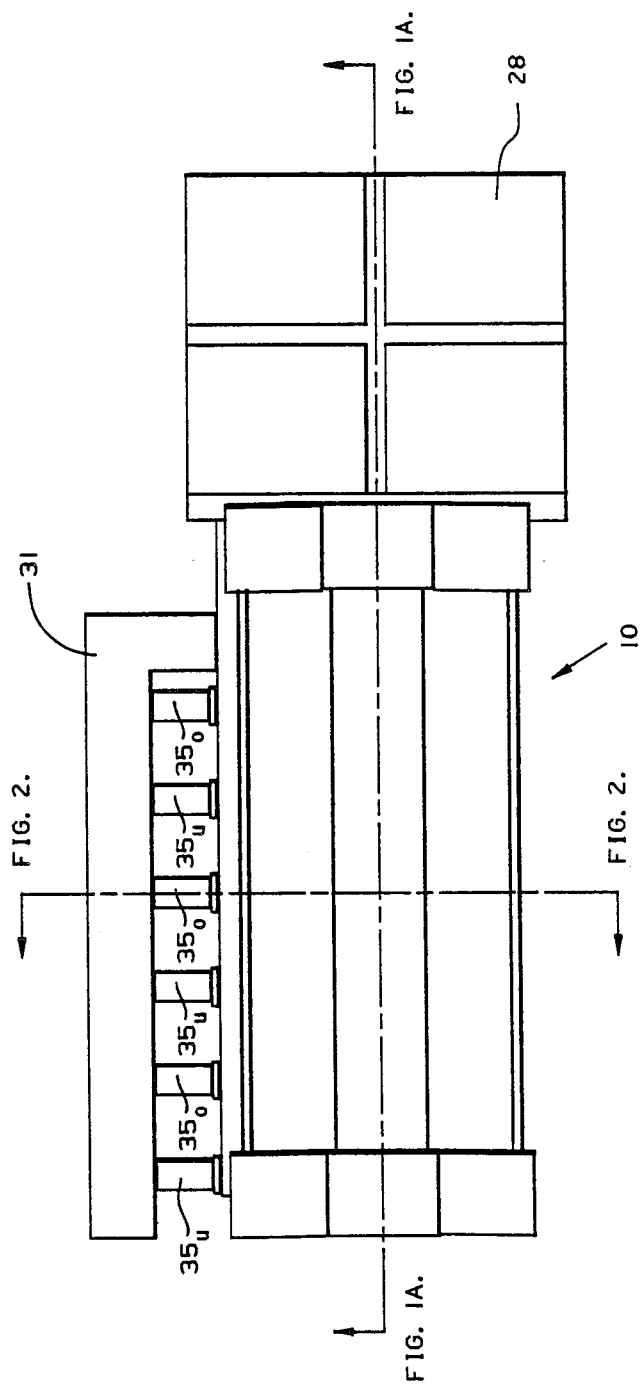

HIGH TEMPERATURE GAS CLEANING IN MUNICIPAL SOLID WASTE INCINERATION SYSTEMS

This application is a continuation of application Ser. No. 07/030,001 filed Mar. 23, 1987, now abandoned.

BACKGROUND OF THE INVENTION

1. Field of the Invention

The present invention is related to an incinerator for burning waste material and, more particularly, to an apparatus for destroying small quantities of toxic orgainc substances which may be present in the exhaust produced by the incineration of municipal solid waste.

2. Description of the Related Art

Proper disposal of solid waste has become an increasingly serious problem as existing sites for land disposal near capacity and new sites become increasingly difficult to locate, while the amount of municipal waste appears to be increasing. Incineration of combustible solid waste has long been used to recduce the quantity of solid matter needing disposal. However, in the last few decades it has become widely known that when municipal solid waste is incinerated, trace amounts of toxic chemicals such as dioxins and furans, among others, may be discharged in the exhaust.

Within the last two decades, studies by the U.S. Environmental Protection Agency, environmental protection agencies in foreign countries, and other groups have determined that such toxic chemicals are broken down at temperatures ranging between 600° C. to slightly over 1300° C. for an exposure period lasting somewhere between one-tenth (0.1) to two and one-half (2.5) seconds. The most recent studies indicate that over 99 percent of some substances, such as biphenyl, dibenzofuran, dibenzo-p-dioxin and tetrachlorobiphenyl, are destroyed at temperatures of slightly over 700° C. with a residence time (exposure period) of approximately one second. These values are based on a study by Duvall and Rubey, conducted in 1977 and published in "Laboratory Evaluation of High-Temperature Destruction of Polychlorinated Biphenyls and Related Compounds", U.S. EPA Report EPA-600-2-77-228. More recent studies including one conducted for the Danish National Environmental Protection Agency with results published in 1984 under the title "'MILJO-RAPPORT' Bilag rapporten om Dannelse og spredning of Dioxiner isaer i forbindindelse med affaldsforbraending", translated as "Formation and Dispersion of Dioxins, Particularly in Connection with Combustion of Refuse", indicate that exposing exhaust gases to a temperature of approximately 1000° C. for a period of at least two seconds results in destruction of essentially all dioxins and furans.

The results of these studies appear contradictory to practical experience, in that temperatures well above 1000° C. are commonly reached in the process of incinerating municipal solid waste, yet it is known that potentially toxic materials are present in the exhaust from municipal waste incinerators. To elucidate the nature, or source, of this problem, reference is had to FIGS. 1A to 1C, which illustrate a type of incinerator in common use, known as a water-cooled rotary combustor; FIG. 1A also schematically illustrates the incorporation therein of the present invention, discussion of which is deferred to a later section of this disclosure.

The water-cooled rotary combustor of the foregoing figures comprises a combustion barrel 10 having a generally cylindrical side wall 23 formed of longitudinally extending cooling pipes 24 and gas-porous interconnections 36, such as perforated webs (FIG. 1A illustrating only a few such webs 36 between adjacent cooling pipes 24). The combustion barrel 10 has a central axis of rotation which is inclined slightly from the horizontal, proceeding downwardly from an input end 16 to an exit 18. Thus, the cooling pipes 24 and perforated webs 31 are also slightly inclined from the input end 16 until the pipes 24 bend inside the flue 28. The cooling pipes 24 have first and second ends disposed adjacent the exit end 18 and input end 16, respectively, of the barrel 10. Combustion typically is initiated in the barrel 10 by using an auxiliary fuel, such as oil or natural gas, which can be supplied through the input end 16 of the combustion barrel 10, as disclosed in Harris et al. '651.

The perforated webs 36 are preferably formed of bar steel having openings 37 therein, for supplying combustion air to the interior of the combustion barrel 10. The webs 36 extend from the input end 16 and along the generally straight axial portions of the pipes 24 to an angled section 24a inside the flue 28. No webs 36 are included after the angled section 24a, in which the cooling pipes 24 extend in a somewhat converging relationship to the exit end 18 of the barrel 10, permitting exhaust 20, including exhaust gases and solid particles such as fly ash, and solid combustion products 22, e.g., ash and cinders, to escape more easily from the barrel 10.

As illustrated in FIG. 1A, the cooling pipes 24 are affixed to annular support bands 13 which are received on rollers 12. The rollers 12 may be driven to rotate the barrel 10 about its longitudinal axis, or a separate ring gear (not shown) may be attached to the side wall 23 and driven by a pinion, as disclosed in U.S. Pat. No. 3,822,651 to Harris et al., incorporated herein by reference.

As noted above, high temperatures in excess of 1000° C. are reached in the combustion barrel 10, waste 14 being input at the generally open input end 16 and incinerated by air supplied through windboxes 38. The combustion barrel 10 is able to withstand such high temperatures because coolant is circulated through the cooling pipes 24 and discharged from the barrel 10 via a ring header 17 and supply pipes 26. High-energy coolant discharged by the supply pipes 26 is circulated by a pump 32 through a rotary joint 30, such as the joint disclosed in Harris et al. '651, to heat exchanging equipment 34 which returns low-energy coolant to the ring header 17 via the pump 32, joint 30 and supply pipes 26. The ring header 17 distributes the low-energy coolant to a first set of the cooling pipes 24 which transport the coolant the length of the barrel 10 to return means, such as U-tubes 39 at the input end 16 of the barrel 10. The U-tubes 39 couple the first set of cooling pipes 24 to a second set of cooling pipes 24 which return the coolant to the ring header 17 to be discharged to the heat exchanging equipment 34. The heat exchanging equipment 34 may include a boiler 40 (FIG. 1C), a condenser, connection to a steam driven electrical power generation system, etc., (all not shown) as known in the art.

As illustrated in FIG. 2, air is supplied to the combustion drum 10 by a air duct 30 which is connected to the windboxes 38 via individual control ducts 35. There are a total of six windboxes 38 disposed under the combustion barrel 10. The windboxes 38 are arranged in three zones from the input end 16 to the exit end 18, as illustrated in FIG. 1A, with one underfire windbox 38$_u$ and one overfire windbox 38$_o$ in each zone, as illustrated in FIG. 2. A cut-away 59 is provided in FIG. 2 to illustrate the connection of underfire windbox 38$u$ to control duct 35$u$. The windboxes 38 receive the combustion air under pressure from a blower (not shown). The pressure is maintained by seal strips 54 which extend longitudinally along the exterior of the combustion barrel 10 and have a dog leg-shaped cross-section, as illustrated in FIG. 2. The seal strips 54 are continuous for at least the axial length of one windbox 38 and help form a pressure seal against windbox edges 56 so that the combustion air exiting the windboxes 38 enters the combustion barrel 10.

An enclosure 57, illustrated in FIG. 2, but excluded from FIG. 1A to simplify the drawing, is supported on a suitable surface by supports 58. The enclosure 57 surrounds the side of the barrel 10 so that combustion air is pulled from the input end 16 and windboxes 38 by an induced draft fan 50 (FIG. 1C). The induced draft fan 50 is coupled to the flue 28 downstream from the rotary combustor to maintain the flue 28 at slightly below atmospheric pressure. Thus, essentially all exhaust gases in the exhaust 20 exit from the combustion barrel 10 via the flue 28.

The above-described rotary combustor produces gas temperatures in the exhaust gases of up to 1100° C. However, the side wall 23 of the combustion barrel 10 is maintained at a temperature of approximately 275° C. by the circulated coolant. The walls of the flue 28 are typically lined with boiler tubes (not shown) coupled to the heat exchanging equipment 34 and thus, are maintained at approximately 275° C. However, the heat distribution in municipal solid waste incinerators is so uneven that not every molecule of exhaust gas is exposed to 1000° C. for a sufficient period of time to destroy trace organic substances such as dioxins and furans.

A conventional exhaust cleaning system 41 for a rotary combustor is illustrated in FIG. 1C. In a typical rotary combustor installation, the coolant output from the combustion barrel 10 is supplied via pipes 33$a$ and 33$b$ to a boiler 40 prior to being supplied to other elements of heat exchanging equipment 34. The boiler 40 extracts heat from the high temperature exhaust 42 and transfers the heat to the coolant. Thus, the exhaust 44 output from the boiler 40 is considerably lower in temperature than the exhaust 42, as a result of passing through the boiler 40. The reduced temperature exhaust 44 passes through a cyclone separator 46 for removing larger particles and is passed through a gas clean-up station 48 which typically is a conventional "baghouse" or an electrostatic precipitator. An induced draft fan 50 aids in the flow of the exhaust 42 and 44 through the boiler 40, cyclone separator 46 and gas clean-up station 48, and finally the reduced temperature exhaust 44 is discharged as emissions 53 from a discharge port 51 in a stack 52.

Conventionally, when additional gas clean-up, beyond that provided by the cyclone 46 and the baghouse station 48, is desired, additional elements, such as electrostatic precipitators, scrubbers, or catalysts, are added to the gas clean-up station 48 or in, or on top of, the stack 52. None of these known devices has been shown to function efficiently for removing organic substances. Furthermore, due to the relatively low temperature of the exhaust gases at these points, considerable external sources of heat are required if toxic organic substances are to be destroyed by heating in the clean-up station 48 or stack 52. In addition, postponing the removal of solids until after passage of the exhaust through the boiler 40 results in formation of deposits in the boiler 40 degrading heat transfer from the exhaust to coolant routed through the boiler 40.

SUMMARY OF THE INVENTION

An object of the present invention is to remove toxic organic substances from exhaust produced in the process of incinerating waste material.

Another object of the present invention is to destroy toxic organic substances in the exhaust of incinerated waste material by using the heat produced by incinerating the material.

A further object of the present invention is to remove solids from exhaust produced by a waste material incinerator to minimize deposition of solids on boiler walls and reduce cleaning and maintenance of the boiler.

Another object of the present invention is to eliminate the need for soot blowers in the exhaust flue of waste material incinerator.

Yet another object of the present invention is to use a single filter for filtering solids from incinerated waste material exhaust and destroying toxic organic substances in the exhaust.

The above objects are attained by providing an apparatus for cleaning the exhaust, containing a toxic organic substance, produced by an incinerator in the process of burning waste material. The apparatus comprises exhaust channelling means for transporting the exhaust, produced by the incinerator, to a discharge port for discharge to the atmosphere. The apparatus also comprises filter means, disposed in the exhaust channelling means, for absorbing heat from the exhaust to reach a temperature above 700° C. and for detaining all exhaust gases in the exhaust for a time period sufficient to destroy substantially all of the toxic organic substance in the exhaust. In one embodiment in which the incinerator has an input end for receiving the waste material and an exit end for discharging the exhaust, the exhaust containment means comprises a flue, having a longitudinal axis and an interior surface, surrounding and sealed to the exit end of the incinerator; the filter means comprises a ceramic gas-porous filter disposed within the flue, and thus downstream of the exit end of the incinerator, and sealed to all sides of the interior surface of the flue.

Preferably, the filter is heated to a temperature of approximately 1000° C. and all exhaust gases in the exhaust are heated to that temperature. Preferably, the apparatus further includes means for periodically cleaning the filter to remove solid particles accumulated on the exterior surface of the filter. The apparatus also preferably includes means for sensing a pressure drop across the filter so that the cleaning means can clean the filter automatically when the pressure drop sensed by the sensing means falls below a predetermined pressure differential.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 1B is a top plan schematic view of the rotary combustor illustrated in FIG. 1A;

DESCRIPTION OF THE PREFERRED EMBODIMENT

The present invention is capable of destroying toxic organic substances in a noncatalytic process, without requiring auxiliary sources of energy. In the illustrated embodiment, the invention is used in conjunction with the known rotary combustor illustrated in FIGS. 1A, 1B and 2 and described above. However, the present invention is not limited to the illustrated embodiment, but can be used with any municipal incinerator which produces exhaust gases having temperatures of over 700° C., and preferably approximately 1000° C. or more.

Figure 1A:
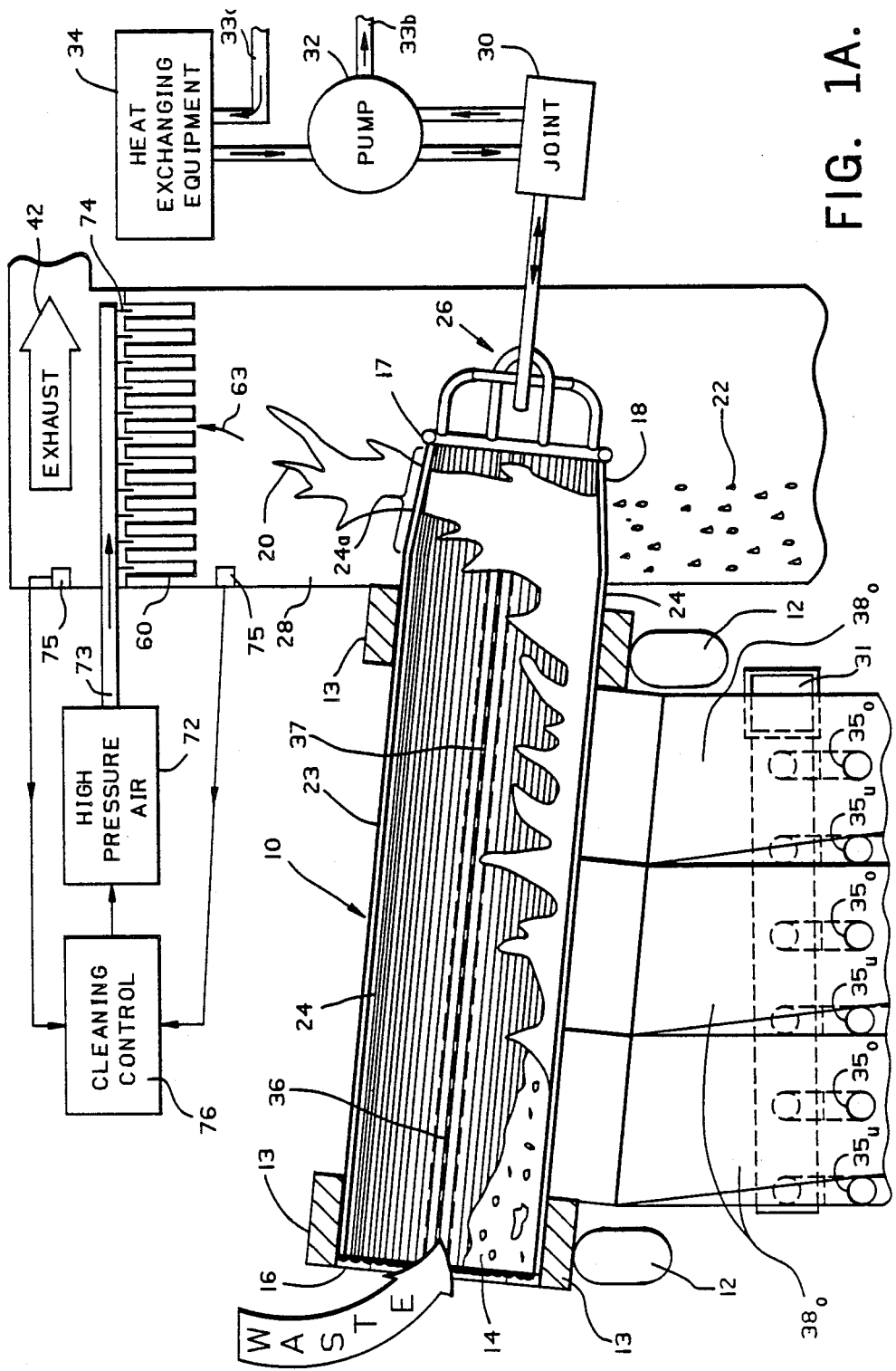
FIG. 1A is a cross-sectional, side elevational schematic view of a rotary combustor incorporating the present invention.

As schematically illustrated in FIG. 1A, according to the present invention a refractory filter 60, which removes particulates from the exhaust 20, is inserted in a high temperature region of the flue 28. The filter 60 is preferably formed of ceramic materials which are heated by the exhaust 20 to temperatures of approximately 1000° C. Any filter which is capable of withstansing such temperatures and presents a sufficient barrier to dioxins and furans to detain their passage for a time period sufficient to heat all of the exhaust gases can be used. The filter porosity, volume of the flue 28 used by the filter 60 and capacity of the induced draft fan 50 must be balanced so that the exhaust flow rate produced by the induced draft fan 50 (FIG. 1C) is sufficient to maintain a rate of combustion in the combustion drum 10 which completely incinerates the material, while using an induced draft fan that is comparable to those used in the prior art.

Figure 3:
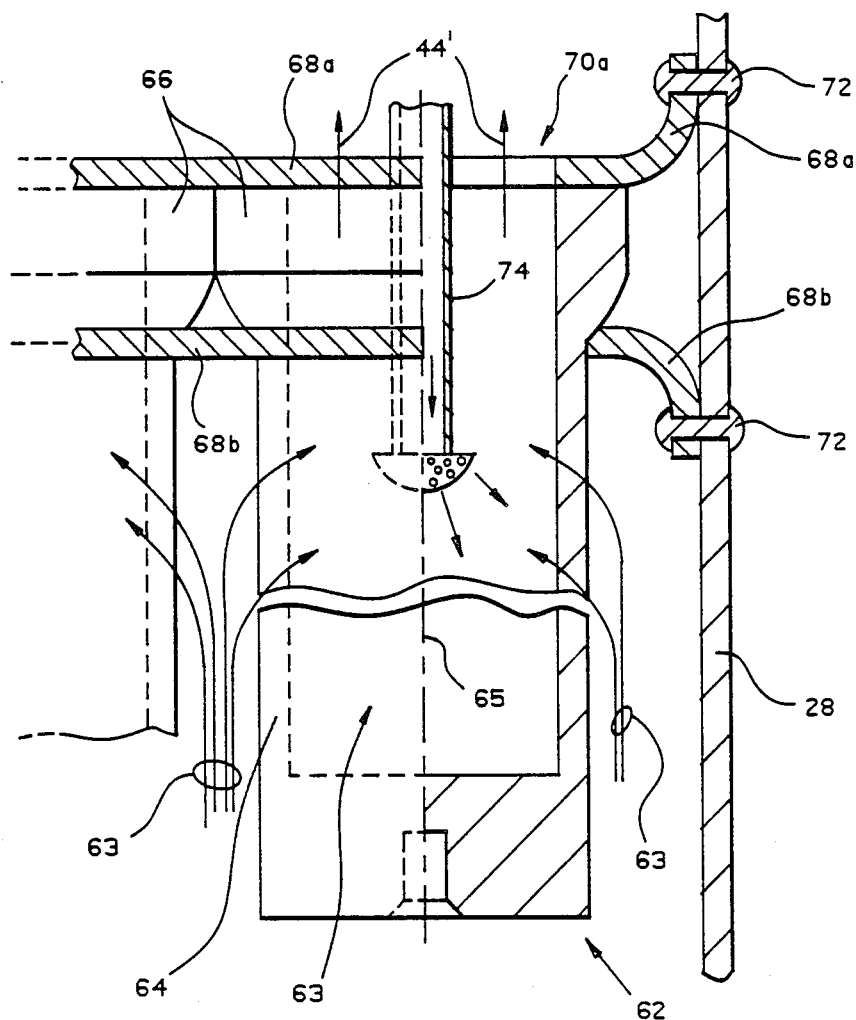
FIG. 3 is a cross-sectional, side elevation view of a portion of a filter according to the present invention.

In the embodiment illustrated in FIG. 3, the filter 60 comprises ceramic gas-porous filter elements 62 disposed in the exhaust flow 63, as illustrated in FIG. 3 and schematically in FIG. 1A. The ceramic gas-porous filter elements 62 may be a flanged filter candle, known as a SCHUMACEL HTHP 60/40 which has a cylindrical portion 64 with an inner diameter of 40 mm and an outer diameter of 60 mm and a roughly annular base 66 with an outer diameter of 74 mm. The length of the cylinder is 1500 millimeters or approximately 5 feet, thus providing a large amount of surface area. The SCHUMACEL is formed of gas-porous silicon carbide which as known in the art has no catalytic effect. SCHUMACELs are manufactured by Schumacher-Sche Fabrik GmbH of Bietigheim, West Germany and have been used to filter solids from the exhaust of fluidized bed coal burners.

Figure 4:
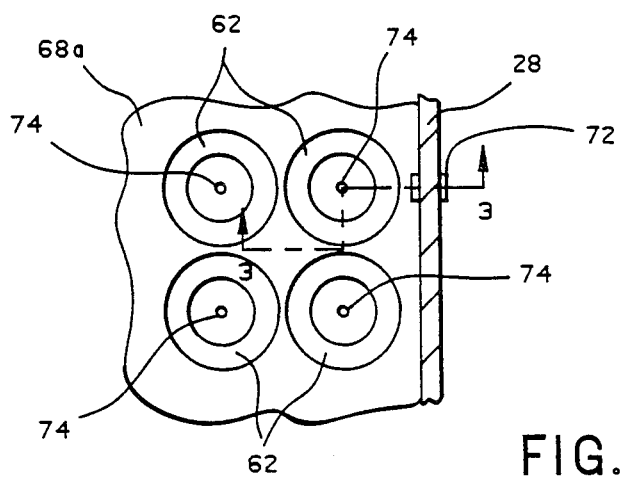
FIG. 4 is a schematic top view of a portion of a filter according to the invention.

In the filter 60 used in the present invention, the bases 66 of the filter elements 62 are connected and sealed to element connection means, provided by a supporting structure 68a, 68b which in turn is sealed to the wall of the flue 28, as illustrated in FIG. 3. As a result, all gases passing through the flue 28 must pass through the filter elements 62 and out through opening 70 in the supporting structure 68a, 68b as exhaust 44'. In the embodiment illustrated in FIG. 3, two pieces 68a and 68b of sheet steel provides support for the filter elements 62. As indicated in FIG. 4, to the left of center line 65, FIG. 3 is a cross-section taken along a plane passing between the filter elements 62, while to the right of center line 65, the view is along a plane passing through a row of the filter elements 62. As illustrated in FIG. 3, the flanged based 66 are sandwiched between the two pieces 68a and 68b of sheet steel. Circular openings 70a are formed in the top plate 68a with a diameter at least as large as the inner diameter of the filter elements 62, but smaller than the outer diameter of the bases 66. Similar openings are formed in the lower sheet 68b with a diameter slightly greater than the outer diameter of the main cylindrical portion 64 of the filter elements 62. The pieces 68a and 68b of sheet steel are then attached and sealed to the wall of the flue 28 via fastening means, such as rivets 72.

Other means for supporting the filter elements 62 may be used, provided they hold the filter elements 62 securely in place, so that the filter elements do not pick up vibrations and knock against each other, and so that an effective seal is formed to ensure that substantially all of the exhaust gases pass through the filter elements 62. For example, a single sheet of steel or other material, with appropriate openings 70a therein, may be attached to the filter elements 62 by an adhesive capable of withstanding temperatures between the ambient temperature and 1200° C. Similarly, the supporting structure 68a, 68b may be attached to the flue 28 by any known means which provides a good seal. In FIG. 3, the bases 66 of the filter elements 62 are illustrated as being in edge-to-edge contact, which is preferable from the point of view of minimizing the pressure drop across the filter 60 by providing a large surface area. On the other hand, when the filter elements are so closely packed, the rigidity of the supporting structure 68a, 68b must be sufficient to ensure that vibration does not cause the bases 66 to damage each other. Also, other types of refractory filters 60 may be used, provided the material is able to withstand the temperatures present in the flue and has a porosity such that the material detains exhaust gases for a sufficiently long period of time to destroy toxic organic substances therein, while requiring a volume and having a pressure drop thereacross comparable to prior art filters.

Figure 1C:
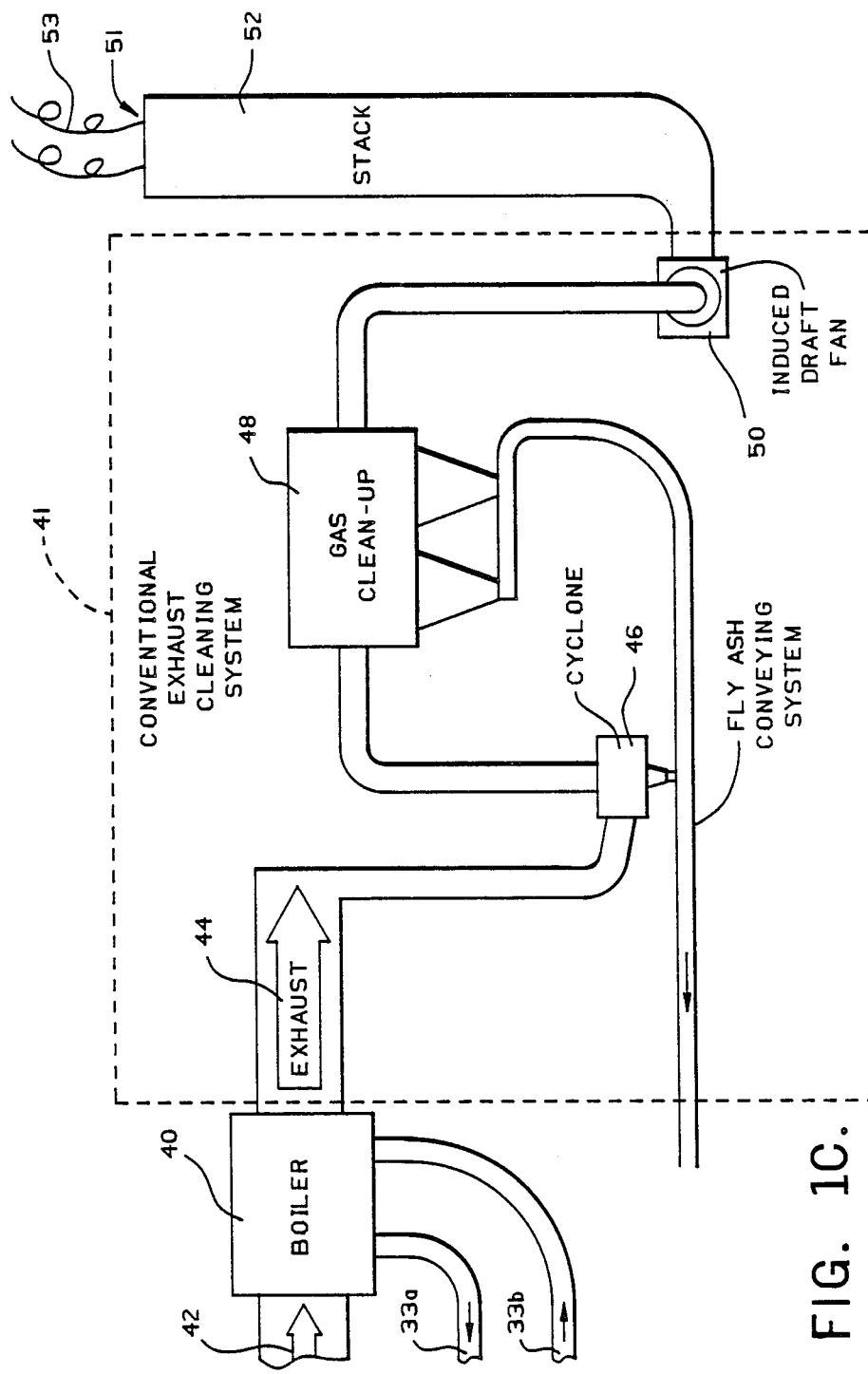
FIG. 1C is a schematic view of a conventional exhaust cleaning system.
Figure 2:
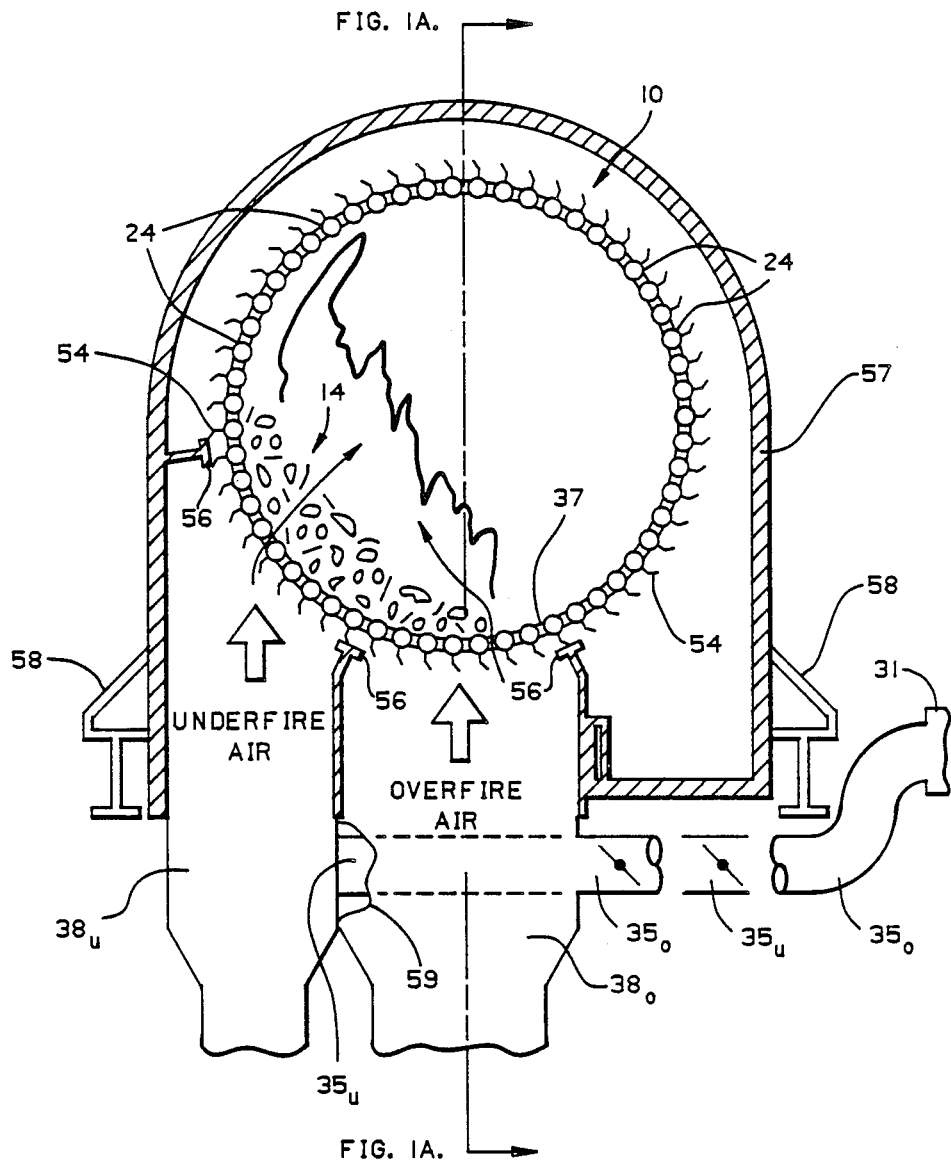
FIG. 2 is a cross-sectional and elevational schematic view in a plane transverse to the axis of a prior art rotary combustor, such as the rotary combustor illustrated in FIG. 1A.

In addition to destroying toxic organic substances in the exhaust gases, the filter 60 removes solid particles, such as fly ash, that, together with the exhaust gases, are present in the exhaust 20, thus producing the clean exhaust 44'. Therefore, it is expected that toxic organic substances present in the solid particles removed from exhaust 20 by the filter 60 will also be destroyed. As a result, most of the gas clean-up equipment illustrated in FIG. 1C is unnecessary and no detrimental deposition of particulates occurs in the boiler 40 when using a filter according to the present invention. Thus, cleaning and maintenance of the boiler 40 is reduced and the conventional gas clean-up equipment 48 (FIG. 1C) may be removed so that the total pressure drop between the combustion barrel 10 and the induced draft fan 50 may be comparable to that in a prior art system. Otherwise, a more powerful induced draft fan 50 may be required in part because solid particles in the exhaust 20 will accumulate on the upstream surface of the filter elements 62.

Therefore, means must be provided for cleaning the filter elements 62. For this purpose, as illustrated in FIG. 1A, a source of high pressure air 72 is provided. Nozzles 74, best seen in FIG. 3, are coupled to the source of high pressure air 72 by a pressure line 73. Periodically, air is ejected through the nozzles 74 to reverse the direction of gas flow through the cylinders 64, dislodging clumps of the accumulated solid particles from the surface which then fall through the flue 28 and may be disposed of in the conventional manner used to remove the solid combustion products 22. The high pressure air 72 may be provided from any conventional source and the pressure line 73 and nozzles 74 may be formed of any non-porous material which is capable of withstanding temperatures of over 1000° C. The nozzles 74 need not be constructed as illustrated, but may have any from suitable for the purpose of reversing gas flow through the filter elements 62.

Cleaning of the filter 60 may be performed periodically, at fixed time intervals, or as needed. Preferably, the pressure drop across the filter 60 should be no greater than approximately two inches of water, i.e., slightly less than one tenth (0.1) psi. For this purpose, pressure sensors 75 are inserted into the flue 28, one each upstream and downstream of the filter 60. The pressure sensors 75 produce signals that are supplied to a cleaning control unit 76 which determines the pressure differential between the two signals and provides a control signal to the high pressure air source 72 when the differential pressure rises above the predetermined level, e.g., two inches of water. The pressure sensors sensors may be of any conventional type, such as 1151 Series, manufactured by Rosemount of Minneapolis, Minnesota, which are capable of withstanding temperatures of over 1000° C. The cleaning control unit 76 may comprise a conventional microprocessor, such as an INTEL 88/40.

The many features and advantages of the present invention are apparent from the detailed specification, and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. An apparatus for cleaning an exhaust containing a toxic organic substance produced in trace amounts by an incinerator in the process of burning waste material, the incinerator having an input end for receiving the waste material and an exit end for discharging the exhaust, said apparatus comprising:

a flue, having an interior surface surrounding the exit end of the incinerator, for transporting the exhaust produced by the incinerator to a discharge port; and filter means, disposed in and sealed to said flue intermediate the exit end of the incinerator and the discharge port, for absorbing heat from the exhaust to reach a temperature above 700° C. and for detaining substantially all of the exhaust for a time period sufficient to destroy substantially all of the toxic organic substance in the exhaust, said filter means comprising a ceramic gas-porous filter disposed downstream from the exit end of the incinerator and sealed to the interior surface of said flue, including a plurality of ceramic gas-porous filter elements, each of said ceramic gas-porous filter elements including a substantially cylindrical portion with a closed first end facing the exhaust flowing from the exit end of the incinerator and a base at a second end, the base having a roughly annular shape with an outer diameter larger than the outer diameter of the cylindrical portion of said ceramic gas-porous filter element; and element connection means for supporting and sealing said ceramic gas-porous filter elements together at the base of each of said ceramic gas-porous filter elements.

2. An apparatus as recited in claim 1, wherein:

the exhaust from the incinerator comprises solid particles which accumulate on the upstream surface of said ceramic gas-porous filter elements; and said apparatus further comprises cleaning means for periodically cleaning said ceramic gas-porous filter elements to remove the solid particles accumulated on the upstream surface of said ceramic gas-porous filter elements.

3. An apparatus as recited in claim 2, wherein said cleaning means comprises:

pressurized air supply means for supplying air at a pressure above atmospheric pressure; and nozzles, coupled and sealed to said pressurized air supply means, each of said nozzles having an output end disposed inside inside the cylindrical portion of a corresponding ceramic gas-porous filter element, for injecting air into the cylindrical portion of the corresponding ceramic gas-porous filter element to disengage clumps of the solid particles accumulated on the upstream surface of the corresponding ceramic gas-porous filter element.

4. An apparatus as recited in claim 3, wherein:

said apparatus further comprises sensing means for sensing a pressure drop across said ceramic gas-porous filter; and said cleaning means injects the air into said ceramic gas-porous filter elements when the pressure drop sensend by said sensing mean rises above a predetermined pressure differential.

* * * * *